Oct. 15, 1935.  J. P. GATY  2,017,692

LANDING LIGHT FOR AIRPLANES

Filed March 9, 1935

INVENTOR
John P. Gaty
BY
Hoguet, Neary & Campbell
ATTORNEYS

Patented Oct. 15, 1935

2,017,692

UNITED STATES PATENT OFFICE 2,017,692

LANDING LIGHT FOR AIRPLANES

John P. Gaty, Woodside, N. Y., assignor to Fairchild Aerial Camera Corporation, Woodside, N. Y., a corporation of New York Application March 9, 1935, Serial No. 10,180

8 Claims. (Cl. 33—46)

This invention relates in general to landing lights for aircraft.

It is fully appreciated that airplanes are provided with ordinary altimeters and the like for indicating the altitude of the airplane. In night flying however this altitude indication is insufficient for landing purposes. In other words a pilot would not want to rely entirely upon such an altitude indication alone while landing. The ordinary fixed landing lights for projecting light beams forwardly of the airplane does not give a very exact indication as to the altitude of the airplane during its landing glide. I am aware of the fact that it had been proposed to project light beams substantially vertically from the underside of the airplane for visual indication of the altitude of the airplane. This type of visual indication is however unsatisfactory in that an observation of such light beams would necessarily distract the pilot's attention from the point on the terrain towards which the airplane is headed.

In providing adequate landing lights for airplanes, it is important to provide the pilot with a clear view of the terrain and the objects ahead during the different attitudes that the airplane takes while on the ground with respect to its transverse axis and the different attitudes that the airplane may take while in flight with respect to its transverse and longitudinal axes. The usual fixed landing lights are inadequate as they merely extend straight ahead either along the longitudinal axis of the airplane or at a fixed angle thereto. Hence they are adequate only for a normal straight landing glide.

Such lighting systems are inadequate in the event that the landing operation includes such an airplane maneuver as a slip or a turn as the lights would under such conditions not be trained upon the ground ahead where the landing is to take place. It would therefore be necessary to make these lights adjustable so that the pilot could shift them while he is landing if the landing maneuver included a slip or a turn. Now the pilot is already overburdened with instruments and controls of various kinds and it is therefore one of the objects of this invention to provide an adequate lighting system for all conditions without the necessity of manual adjustment or control of the lights.

One of the main objects of my invention is to provide such a stationary landing light system which by predetermined arrangement thereof will afford a visual means readily discernable ahead on the ground during the gliding maneuver to enable the pilot to orientate himself as to his altitude at the time at which he should place the airplane in the proper attitude for landing.

One of the objects of my invention is to provide a stationary lighting system that will afford an adequate illuminated area directly ahead of the airplane while making a straight approach for landing.

Another object is to provide a stationary lighting system that will afford an adequate illumination of obstacles that may be directly in the path of the wheels while the airplane is in motion on the ground.

A further object is to provide a stationary lighting system that will afford an adequate illumination of that point on the terrain toward which the airplane is turning or slipping as distinguished from the direction in which the airplane is pointing.

With the foregoing and other objects in view, the invention consists in the combination of parts and in the details of construction hereinafter set forth in the following specification, certain embodiments thereof being illustrated in the accompanying drawing, in which.

Figure 1:
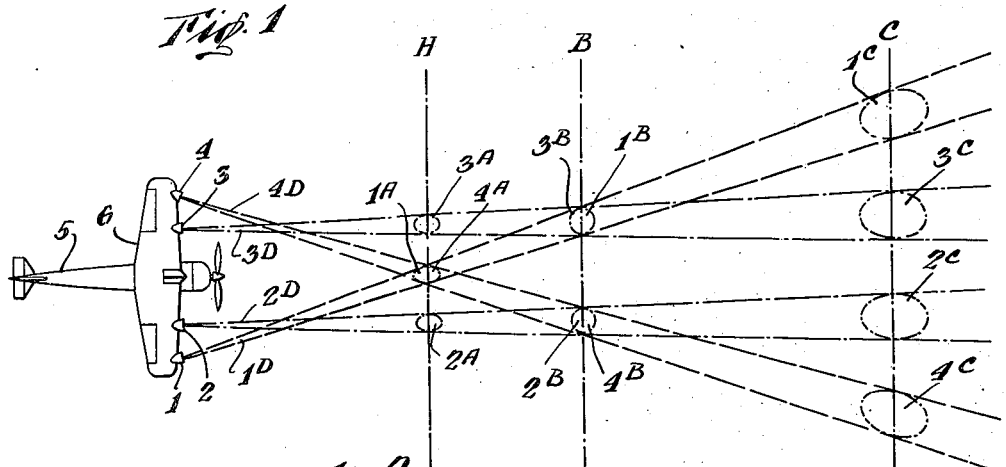
Figure 1 is a diagrammatical view in top plan of an airplane showing the position of the wing lamps and their reflectors and also showing diagrammatically the light beams emanating therefrom and the projected illuminated areas from each beam.
Figure 2:
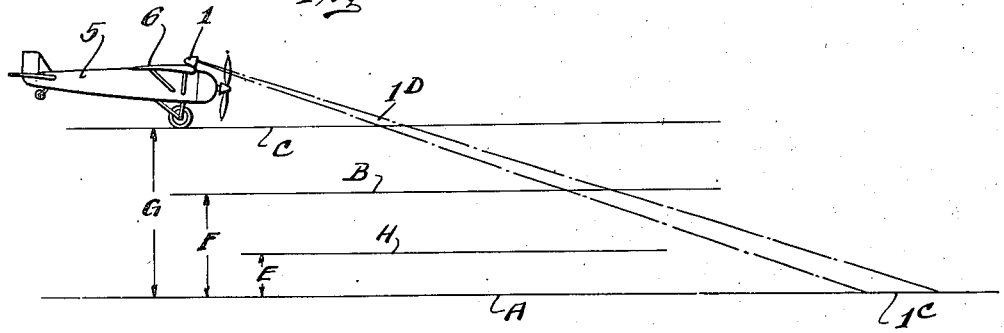
Figure 2 is a diagrammatical view in side elevation of the airplane showing the same disposed at a normal gliding angle with respect to the terrain, showing the light beam emanating from one of the lamps and also diagrammatically illustrating different altitudes at which certain maneuvers of the airplane should take place for landing purposes.

Referring more particularly to the drawing I have shown as a preferred embodiment an airplane generally indicated at 5 provided with a conventional wing 6 to which I attach lamps and their reflectors as indicated at 1, 2, 3 and 4. I prefer to dispose the inner lamps 2 and 3 so that their projected light beams are substantially parallel to the longitudinal axis of the airplane. The lamps 1, 2, 3 and 4 are preferably disposed at a fixed angle with respect to the wing so as to project light beams downwardly at a predetermined angle. The lamps 1 and 4 are also disposed at such an angle inwardly that the light beam 1D of lamp 1 will cross light beam 3D of lamp 3, and light beam 4D of lamp 4 will cross light beam 2D of lamp 2. The angular disposition of the lamps with respect to the wing depends upon the gliding characteristics of the particular aircraft on which the lights are to be installed. They are so positioned that the light beams cross at the points at which they strike the terrain and at a predetermined distance ahead of the aircraft when the same is proceeding at a normal gliding angle of attack and is at a given altitude above the terrain. For landing purposes the airplane should be adjusted about its transverse axis so as to assume a normal gliding angle as generally indicated in Figure 2. As the airplane assumes this normal gliding angle at an altitude C, indicated by the line G above the terrain A, the light beam 1D of lamp 1 illuminates an area 1C and the light beam 4D of lamp 4 simultaneously illuminates the area 4C. Likewise the light beams 2D and 3D of lamps 2 and 3 are simultaneously illuminating respectively the areas 2C and 3C so that these illuminated areas 1C, 2C, 3C and 4C are separate and distinct from each other as indicated in Figure 1. This, of course, is due to and dependent upon the spacing and the angular disposition of the lights and the height of the airplane above the terrain.

When the airplane during its descent reaches a given altitude B measurable by the line F from the terrain A, the light beam 1D intersects light beam 3D and beam 4D intersects beam 2D at the points at which they strike the terrain. As a result the illuminated areas 1B and 3B coincide and the illuminated areas 2B and 4B also coincide so that the two resulting illuminated areas are spaced laterally on the terrain in the relative positions shown in Figure 1. Since the characteristic gliding angles for different airplanes are known, the angular disposition of the lamps 1, 2, 3 and 4 may be mathematically calculated so that the coincidence of the crossed light beams will be obtained at a known distance ahead of the aircraft while the aircraft is at a known height. While making an approach for a landing the pilot may be fully assured that as long as the four lighted areas 1C, 2C, 3C and 4C are distinct and separate he has not come sufficiently close to the ground for leveling off purposes. As soon as he sees the four illuminated areas merge into two areas he is visually warned as to his altitude and of the fact that he should level off the airplane for landing.

Failure to act upon this warning within a short space of time, and a continuance of the glide at an angle indicated in Figure 2 to an altitude H, measurable by the line E from the terrain A, will result in the provision of three separate illuminated areas, namely the separate areas 2A and 3A and the coinciding areas 1A and 4A. This distinctive pattern of illuminated areas takes place upon this further decrease of altitude as the light beams 1D and 4D intersect each other at the point where they strike the terrain and no longer intersect light beams 2D and 3D where the latter beams strike the terrain. The lamps 2 and 3, not being angularly disposed with respect to each other or to the longitudinal axis of the airplane, their light beams 2D and 3D never intersect each other. When the pattern assumes this latter mentioned form, namely the three resulting lighted areas 2A and 3A and the merged area 1A and 4A, it will constitute a last warning to the pilot that he must act quickly in leveling off the airplane to avoid a crash which would naturally result by continuance of the glide until the airplane hit the terrain.

Figures 3, 4:
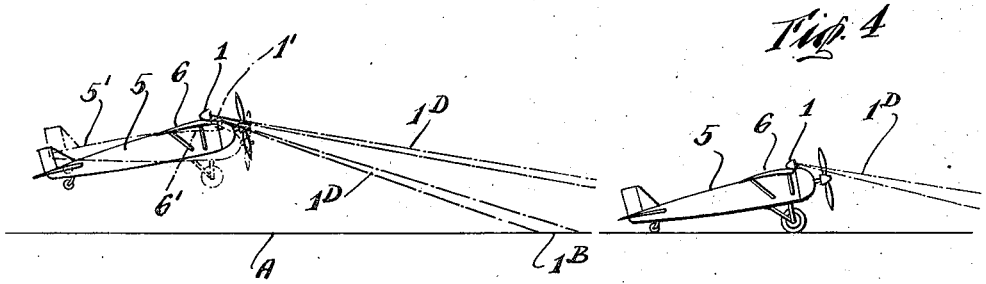
Figure 3 is a view in side elevation of the airplane showing the same in dotted lines disposed substantially horizontally just prior to the position shown in full lines which should be adopted just prior to the time the airplane comes in contact with the ground and also showing the projected light beams from one of the lamps in the two mentioned positions.
Figure 4 is a view in side elevation of the airplane showing the same and the light beam projected by one of the lamps when the airplane is at rest on the ground or in a position for taxiing thereon.

The two stages of leveling off after changing from the glide indicated in Figure 2 are shown in Figure 3. Here in dotted lines is shown the airplane 5' with its wings 6' and one of the lamps at 1' in such position that the angle of attack is substantially zero. Subsequent to bringing the airplane into this position it should be adjusted about its transverse axis so as to present a positive angle of attack, thus placing the airplane in landing position. The airplane is shown in Figure 4 as being in its proper position when either at rest or for taxiing on the ground.

This lighting system, besides providing a very definite means of orientation for the pilot as to his altitude, very definitely constitutes a visual indicating device for gauging his maneuvers during the landing operation. The arrangement of lamps is also made for the purpose of providing adequate illumination whether the airplane is in a straight glide for landing, or coming in to landing during a turn or slip, there always being provided sufficient illumination of the terrain towards which the airplane may be approaching. In taxiing position the light beams 2D and 3D are preferably projected diagonally downwardly but otherwise straight ahead in parallelism with each other and the longitudinal axis of the airplane. As a further precaution for adequate lighting purposes I prefer to arrange these two lamps 2 and 3 so that they will be immediately above the landing wheels themselves. This is for the purpose of sufficiently illuminating the terrain directly ahead of the landing wheels so as to illuminate any obstacles in the way thereof. The light beams 1D and 4D after they cross each other afford an expansion of the lighted area with regard to the longitudinal axis of the airplane while the airplane is being taxied as well as while it is being landed.

One of the great difficulties in heretofore used landing light systems has been the lack of provision of lights that would illuminate the ground towards which the airplane is actually approaching when it was in a turn or a slip or any other attitude than a straight forward glide. For instance, in a turn or a slip, the pilot has been unable to see the ground toward which the end of the relatively lower wing of the airplane is approaching. By means of my preferred lighting system should the airplane be rocked about its longitudinal axis so that one wing is relatively higher than the other as would be the case in a turn or a slip, that lamp adjacent the upper wing by reason of its angular disposition illuminates an area on the terrain toward which the airplane is actually approaching. For instance, assume in the illustration in Figure 1, the airplane to be rocked to the right about its longitudinal axis to assume a vertical or lesser degree of bank for a turn or slip. The light 4, in this case being adjacent the upper wing, projects a beam 4D downwardly so as to illuminate an area 4C which in this case is in the direction towards which the airplane is actually approaching. When the airplane is in such a banked position, it will readily be seen that the light beams from lamps 2 and 3 would illuminate areas on the terrain straight ahead of the airplane and lamp 1 would project a light beam travelling in a direction away from the terrain. It follows of course that if the banking of the airplane were reversed and the lamp 1 were adjacent the end of the higher wing, then it would be this lamp 1 with its beam 1D that would illuminate an area 1C toward which the opposite wing would actually be approaching during this landing operation.

It will thus be seen that I have provided a lighting system for furnishing adequate illumination of the ground for taxiing and taking-off purposes and also for landing purposes, whether the landing maneuver consists solely of a straight glide or includes a turn or slip. It will also be seen that I have provided an adequate visual warning system for night landing, the warning to consist of an initial and final one for the purpose of allowing the pilot to properly land the airplane solely by observation of either or both.

I claim:

1. In combination with an airplane, a landing light system comprising an inner pair of lamps and an outer pair of lamps on said airplane, said inner pair of lamps being so disposed with relation to each other and to said airplane as to project beams of light extending downwardly with respect to the longitudinal axis of said airplane and substantially parallel to each other in a direction forward of said airplane, said outer pair of lamps being so disposed with relation to each other and to said airplane as to project light beams downwardly and inwardly so as to intersect each other at a predetermined distance forwardly of said airplane and to also intersect said parallel light beams a relatively further distance forwardly of said airplane bringing about illuminated areas on the landing surface during a predetermined gliding angle of said airplane which will be separate, partly coincidental or coincidental as the length of the beams vary between the illuminated areas and the light source during said glide and the subsequent change in altitude.

2. In combination with an airplane, a landing light system including a pair of laterally spaced lamps on said airplane for projecting light beams forwardly of said airplane, and downwardly with respect to the longitudinal axis of said airplane and substantially parallel to each other, a pair of lamps thereon respectively arranged on opposite sides of said first named pair of lamps and so angularly disposed downwardly and inwardly as to project light beams that converge to intersect each other at a predetermined point ahead of said airplane and then diverge so as to each intersect one of the light beams of said first named pair of lamps at points in a straight line a predetermined distance still further ahead of said airplane, 3. In combination with an airplane, a landing light system including a pair of laterally spaced lamps on said airplane for projecting light beams forwardly of said airplane, and downwardly with respect to the longitudinal axis of said airplane and substantially parallel to each other, a second pair of lamps thereon respectively arranged on opposite sides of said first named pair of lamps and so angularly disposed downwardly and inwardly as to project light beams that converge to intersect each other at a predetermined point ahead of said airplane and then diverge so as to each intersect one of the light beams of said first named pair of lamps at points in a straight line, a predetermined distance still further ahead of said airplane, the relative angles of disposition of said lamps being so predetermined with relation to the gliding angle of the airplane as to illuminate areas on the landing surface during the normal glide of said airplane and by the merging of said illuminated areas at the points at which certain light beams simultaneously strike the landing surface and intersect each other, constituting a visual indication of the altitude of the airplane during said glide.

4. In combination with an airplane, a pair of lamps thereon so positioned as to project light beams extending forwardly and substantially parallel to each other but downwardly with respect to the longitudinal axis of said airplane, a second pair of lamps so positioned as to project light beams downwardly and forwardly and inwardly so as to intersect each other and the beams of said first pair of lamps.

5. In combination with an airplane, a pair of lamps thereon so positioned as to project light beams extending forwardly and substantially parallel to each other but downwardly with respect to the longitudinal axis of said airplane, a second pair of lamps so positioned as to project light beams downwardly and forwardly and inwardly with respect to said airplane and said longitudinal axis of said airplane so as to intersect each other and the beams of said first pair of lamps, all of said lamps being positioned at predetermined angles with respect to the wings of said airplane so that during a normal glide and at a known altitude above the landing surface the beams of one pair of lamps will each intersect one beam of the other pair of lamps at the instant the beams strike the landing surface so that the illuminated areas on the landing surface resulting from the four beams will merge into two illuminated areas, providing a visual indication of said known altitude and an initial warning to the pilot to level off the airplane for landing.

6. In combination with an airplane, a pair of lamps thereon so positioned as to project light beams extending forwardly and substantially parallel to each other but downwardly with respect to the longitudinal axis of said airplane, a second pair of lamps on said airplane so positioned as to project light beams downwardly and forwardly and inwardly with respect to said airplane and said longitudinal axis of said airplane so as to intersect each other and the beams of said first pair of lamps, all of said lamps being positioned at predetermined angles with respect to the wings of said airplane so that during a normal glide and at a known altitude above the terrain the beams of one pair of lamps will each intersect one beam of the other pair of lamps at the landing surface so that the illuminated areas on said surface resulting from the four beams will merge into two illuminated areas, providing a visual indication of said known altitude and an initial warning to the pilot to level off the airplane for landing, and upon a further decrease in altitude during said glide the beams from said second pair of lamps intersect each other to merge their two illuminated areas into one at the landing surface which in addition to the two illuminated areas of the beams of said first pair of lamps on said surface provided three illuminated areas to constitute a visual indication of a known altitude above the landing surface and a second and final warning to the pilot to level off the airplane for landing.

7. In combination with an airplane, a landing light system thereon comprising a plurality of pairs of lamps on said airplane, one pair being adapted to project spaced light beams extending forwardly and downwardly with respect to the longitudinal axis of said airplane and substantially parallel to each other, a second pair of lamps being so angularly disposed with respect to each other and to the longitudinal axis of said airplane as to project light beams downwardly and forwardly and inwardly with respect to said airplane and said longitudinal axis of said airplane as to intersect each other and the beams of said first pair of lamps, said points of intersection of said beams being determinable with respect to a predetermined altitude of said airplane in a predetermined glide so as to constitute, by means of the observed coincidences of projected lighted areas on the landing surface, a separate initial indication and final indication of said altitude during said glide.

8. In combination with an airplane, a landing light system thereon comprising an inner pair of lamps and an outer pair of lamps on said airplane, said inner pair of lamps being so disposed with relation to each other and to said airplane as to project beams of light extending downwardly with respect to the longitudinal axis of said airplane and substantially parallel to each other in a direction forward of said airplane, said outer pair of lamps being so disposed with relation to each other and to said airplane as to project light beams downwardly and inwardly so as to intersect each other at a predetermined distance forwardly of said airplane and to also intersect said parallel light beams a relatively further distance forwardly of said airplane bringing about illuminated areas on the terrain which simultaneously merge into two illuminated areas when said airplane, during a normal glide at a known altitude above the landing surface and with the transverse axis of said airplane in a horizontal plane so as to provide a visual indication of said known altitude and the lateral position of said airplane during said glide.

JOHN P. GATY.